Jan. 3, 1950 L. J. BOUCHARD 2,493,473
TOOL MECHANISM
Filed April 8, 1948
Fig.1.
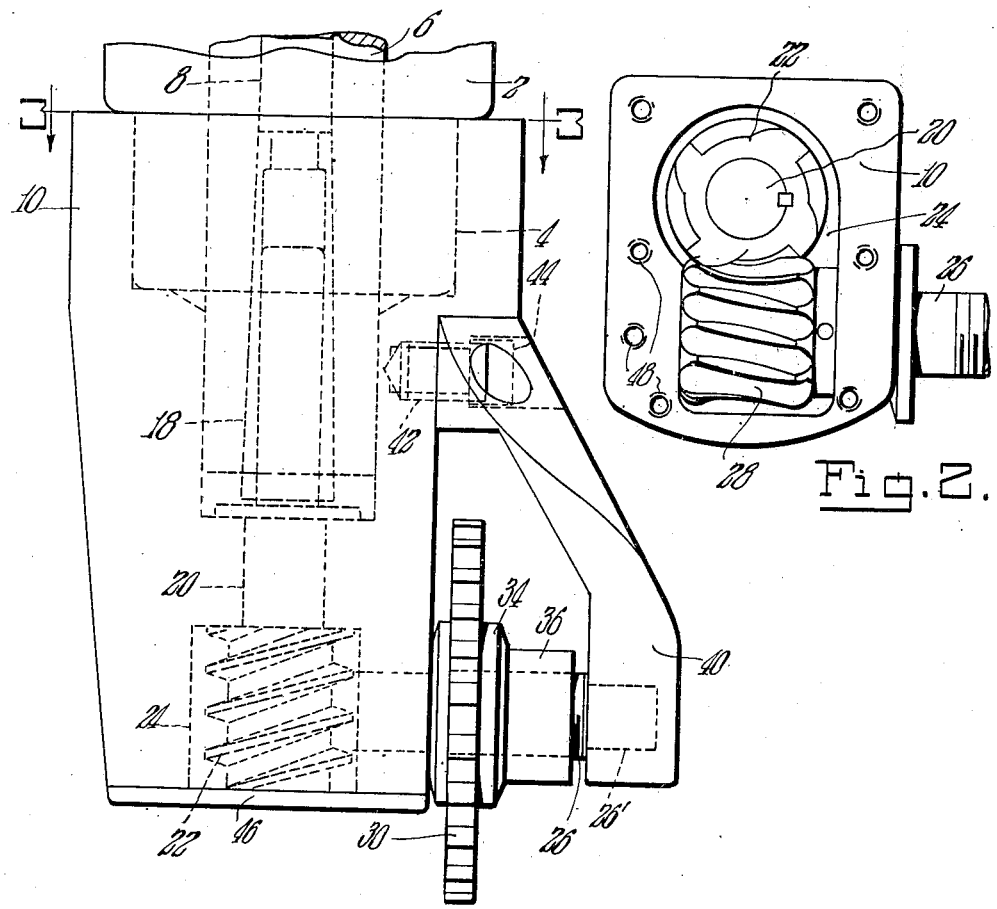
Fig.2.
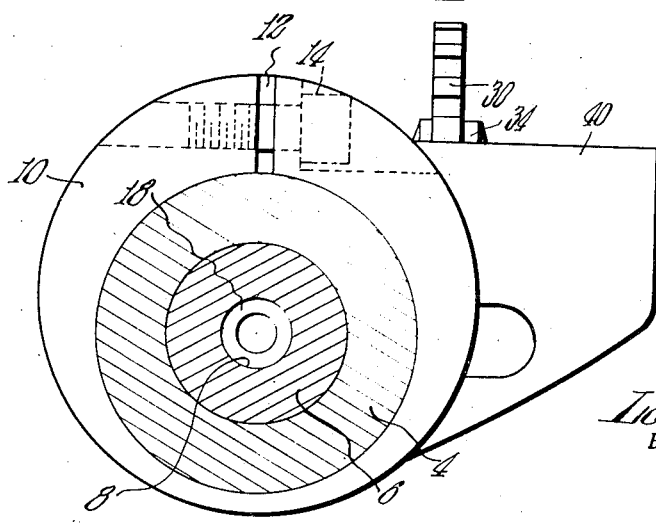
Fig.3
INVENTOR.
Louis J. Bouchard.
BY Walter C. Rm
Attorney.

Patented Jan. 3, 1950

2,493,473

UNITED STATES PATENT OFFICE 2,493,473

TOOL MECHANISM

Louis J. Bouchard, Holyoke, Mass., assignor to Dual Mfg. and Engineering Co., Holyoke, Mass., a corporation of Massachusetts Application April 8, 1948, Serial No. 20,872

2 Claims. (Cl. 90—18)

This invention relates to improvements in machine tools and is directed more particularly to improvements in apparatus for use in connection with machine tools.

The principal objects of the invention are directed to the provision of tool mechanism which is constructed and arranged to enlarge the scope of usefulness of a machine tool.

Frequently it is desired to machine work with tools which rotate on different axes but it has been impossible.

As an instance, a machine tool, known as a Bridgeport milling machine, has a spindle rotatable on an axis which is shiftable relative to the vertical axis. Tools are carried on the end of the spindle and rotate on the longitudinal axis of the said spindle. Often it is desired to perform operations by tools which are rotatable on axes opposed to that of the spindle but this is impossible.

As a result the work is shifted in order that the latter operation may be performed but this shifting is objectionable for the reason that accuracy of related operations is impossible.

According to this invention operations may be performed by a tool rotated on the axis of the spindle and other operations may be performed by a tool rotating on an axis opposed to that of the spindle and driven from that said spindle.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of tool mechanism embodying the novel features of the invention;

Fig. 2 is a plan view of the lower side of the housing shown in Fig. 1 with the cover plate removed; and Fig. 3 is a sectional view on the line 3—3 of Fig. 1.

Referring now to the drawings more in detail, the invention will be fully described.

A quill or bearing of a machine tool is represented by 2 which has a part 4 and a hollow spindle 6 rotatable therein. The spindle has a bore and various tools, chucks for tools, and the like are receivable therein.

With the spindle 6 in rotation a tool at its lower end is rotatable on the longitudinal axis of the shaft whatever its inclination from the vertical.

A housing 10 is provided which is bored to fit on the part 4 and is split at 12 as shown in Fig. 3. A clamp screw 14 is provided as shown to cause the body to embrace the part 4 of the quill.

The lower end of the spindle 6 is received in a socket of the housing and a collet 18 receivable in the bore of the spindle receives the upper end of a drive shaft 20. The shaft 20 is rotatable in the housing and, by means of the collet 18 which is tapering and operably secured in the spindle, the shaft is rotated by the spindle.

A worm 22 is fixed to the drive shaft 20 and is disposed in a hollowed out portion 24 of the housing. A tool shaft 26 is rotatable in the housing and has a gear 28 fixed thereto which is in mesh with the worm 22.

The shaft 26 may carry various tools and as will be noted said shaft is rotatable on an axis opposed to that of the spindle. As shown a cutting tool 30 is clamped to the shaft 26 by a collar 34 and nut 36. In another way a chuck for a tool may be secured to said shaft.

In some cases it may be desired to rotatably support the outer end of shaft 26. To that end a bracket 40 rotatably receives the outer end 26' of shaft 26 and it is secured to the housing by dowels 42 and a clamp screw 44.

A cover plate 46 is secured to the lower end of the housing by screws (not shown) which are in threaded engagement with tapped holes 48 provided in the body.

As will be observed various operations may be performed on work by means of tools carried by spindle 6 and other operations may be performed on the work by tools carried by shaft 26 which rotate on an axis opposed to that of spindle 6. In this way not only is the usefulness of the spindle 6 enhanced but operations may be performed without moving or resetting the work which contributes to speed, economy and accuracy.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Tool rotating mechanism for a machine tool having a quill of a certain diameter and a spindle of less diameter rotatable therein and extending therebelow which is provided with a longitudinal bore extending upwardly therein comprising, a longitudinally extending housing provided with an upper bore of certain diameter at the upper end thereof for receiving said quill and a lower bore of less diameter therebelow for rotatably receiving said spindle, means for securing said housing to said quill, said housing provided with a recess spaced downwardly from said lower bore and extending upwardly from the lower end thereof and a cover plate secured to said housing over and closing said recess, a drive shaft rotatable in said housing on the longitudinal axes of said upper and lower bores between said recess and lower bore having an upper portion for extending upwardly into the bore of the spindle, means securing the upper portion of said drive shaft in the bore of the spindle, a toothed member in the recess of the housing secured to the lower end of said drive shaft, a tool shaft rotatable in said housing on an axis at right angles to the longitudinal axis of said drive shaft having a toothed member fixed to the inner end thereof disposed in said recess and in engagement with the toothed member on the drive shaft, an outer end of said tool shaft for a tool extending outwardly beyond one side of said housing.

2. Tool rotating mechanism for a machine tool having a quill of a certain diameter and a spindle of less diameter rotatable therein and extending therebelow which is provided with a longitudinal bore extending upwardly therein comprising, a longitudinally extending housing provided with an upper bore of certain diameter at the upper end thereof for receiving said quill and a lower bore of less diameter therebelow for rotatably receiving said spindle, means for securing said housing to said quill, said housing provided with a recess spaced downwardly from said lower bore and extending upwardly from the lower end thereof and a cover plate secured to said housing over and closing said recess, a drive shaft rotatable in said housing on the longitudinal axes of said upper and lower bores between said recess and lower bore having an upper portion for extending upwardly into the bore of the spindle, means securing the upper portion of said drive shaft in the bore of the spindle, a toothed member in the recess of the housing secured to the lower end of said drive shaft, a tool shaft rotatable in said housing on an axis at right angles to the longitudinal axis of said drive shaft having a toothed member fixed to the inner end thereof disposed in said recess and in engagement with the toothed member on the drive shaft, an outer end of said tool shaft for a tool extending outwardly beyond one side of said housing, a bracket having an upper portion secured to said one side of the housing above said tool shaft and a lower portion spaced outwardly from the housing rotatably receiving the outwardly extending portion of said tool shaft.

LOUIS J. BOUCHARD.

REFERENCES CITED

The following references are of record in the file of this patent:

UNITED STATES PATENTS

| Number | Name | Date |
|---|---|---|
| 1,029,402 | Ritter | June 11, 1912 |
| 1,144,744 | Wheeler | June 29, 1915 |
| 1,167,647 | Morton | Jan. 11, 1916 |
| 1,394,843 | Keyes | Oct. 25, 1921 |
| 1,397,696 | Nelson | Nov. 22, 1921 |